May 20, 1952  W. R. WICKERHAM  2,597,141
MOTOR CONTROL
Filed Oct. 7, 1946  4 Sheets-Sheet 1

WITNESSES:
E. A. M°Closkey
Curt M. Avery

INVENTOR
William R. Wickerham.
BY
Paul E. Friedemann
ATTORNEY

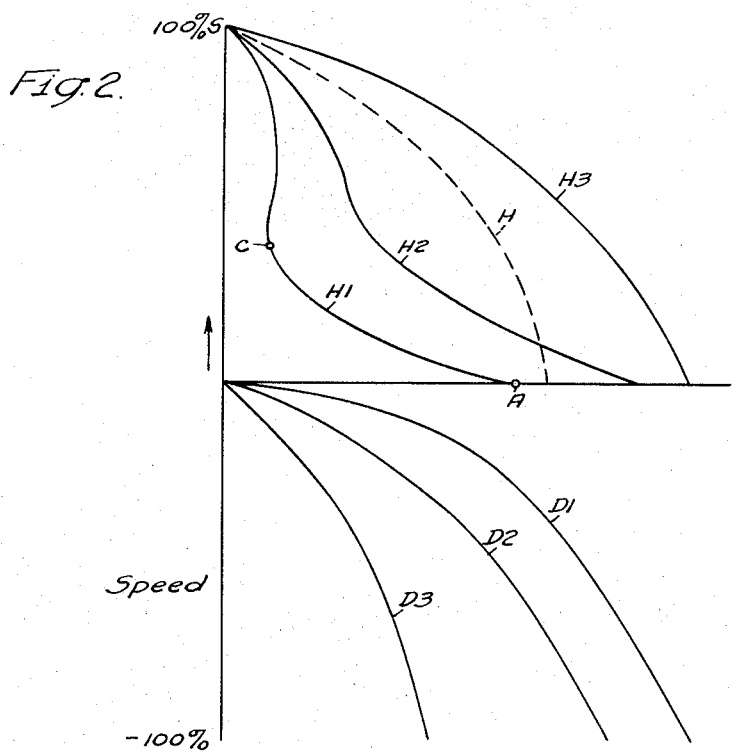
Fig. 2.
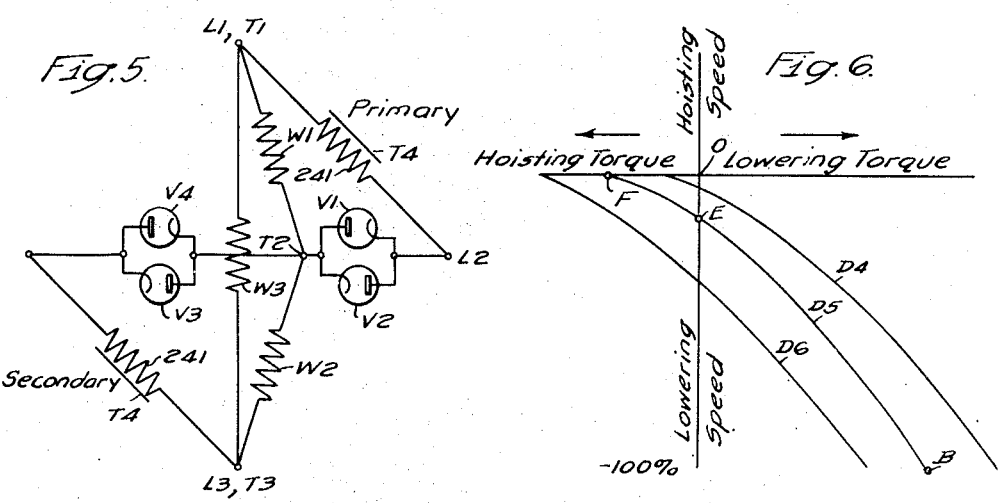
Fig. 5.
Fig. 6.
WITNESSES:
INVENTOR
William R. Wickerham.
BY
Paul E. Friedemann
ATTORNEY

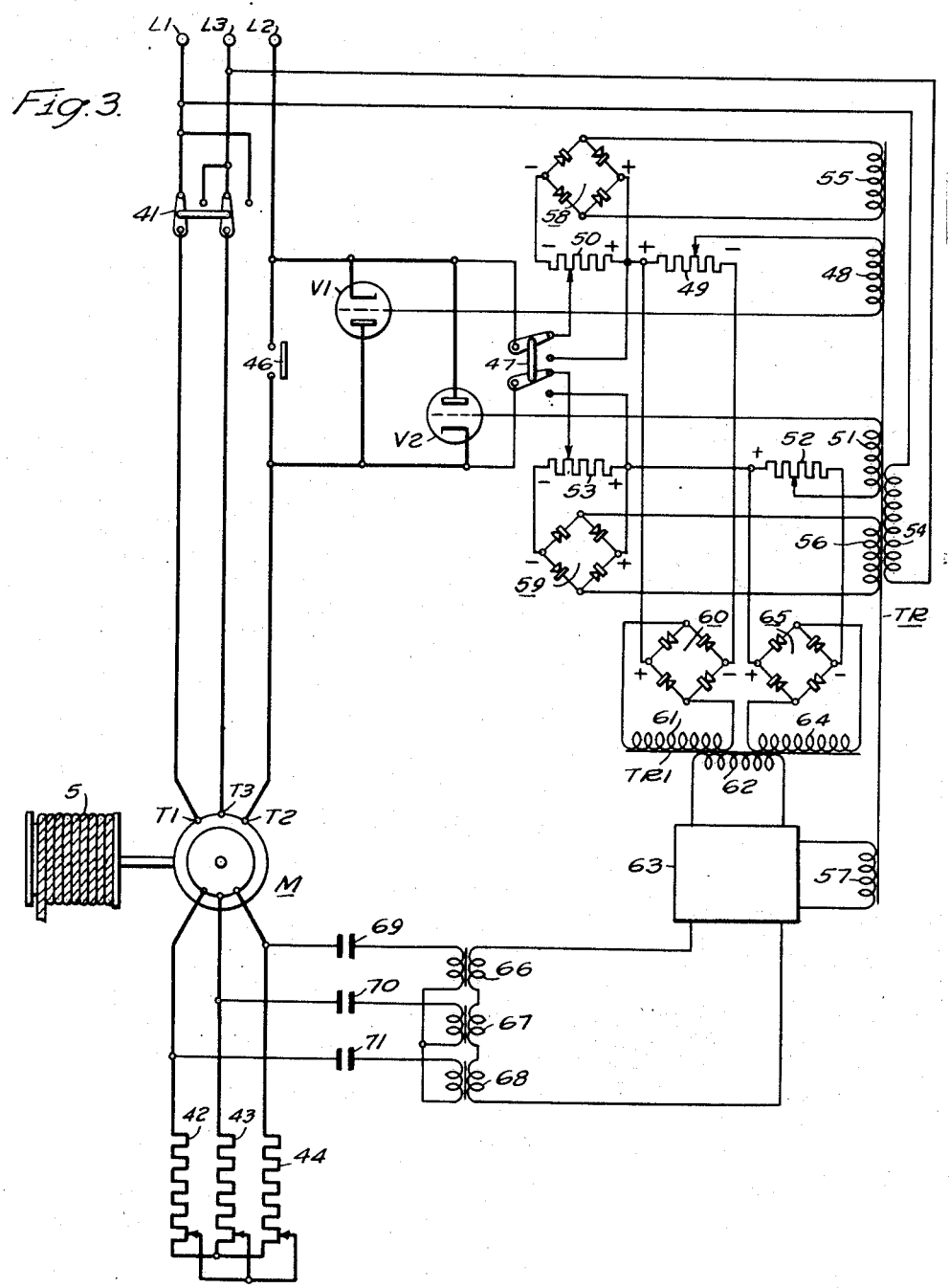

May 20, 1952

W. R. WICKERHAM 2,597,141

MOTOR CONTROL

Filed Oct. 7, 1946

WITNESSES:

INVENTOR
William R. Wickerham.
BY
Paul E. Friedemann
ATTORNEY

Patented May 20, 1952

2,597,141

UNITED STATES PATENT OFFICE 2,597,141

MOTOR CONTROL

William R. Wickerham, Swissvale, Pa., assignor to Westinghouse Electric Corporation, East Pittsburgh, Pa., a corporation of Pennsylvania Application October 7, 1946, Serial No. 701,754

4 Claims. (Cl. 318—203)

My invention relates to control systems for alternating current motors and more particularly to the type of control system in which a desired speed torque characteristic of the motor is obtained by unbalancing the primary multiphase energization of the motor in a controlled degree. Systems of this type are, for instance, disclosed in my Patents 2,386,580; 2,386,581; 2,384,864; and 2,384,865, all assigned to the assignee of the present invention.

It is an object of my invention to provide control systems for multiphase alternating current motors that, while achieving control results similar to those obtained in the above mentioned known systems, are capable of operating with a smaller time constant of control performance.

Another object of my present invention is to obtain particular characteristics of speed torque performance that are not as readily obtained with the comparable control systems heretofore disclosed.

These and other objects of my invention, as well as the means necessary for achieving them will be apparent from the following description of the embodiments exemplified by the drawings, in which:

Fig. 2 is a speed torque diagram representing a set of motor characteristics typical for a control system, as shown in Fig. 1;

Fig. 3 shows diagrammatically the control circuits of another embodiment of the invention whose general performance is similar to that of the preceding embodiment;

Fig. 5 represents a simplified straight line showing of certain parts of the control system shown in Fig. 4; and Fig. 6 shows a speed torque characteristic typical for the performance of a system as shown in Figs. 4 and 5.

Figure 1:
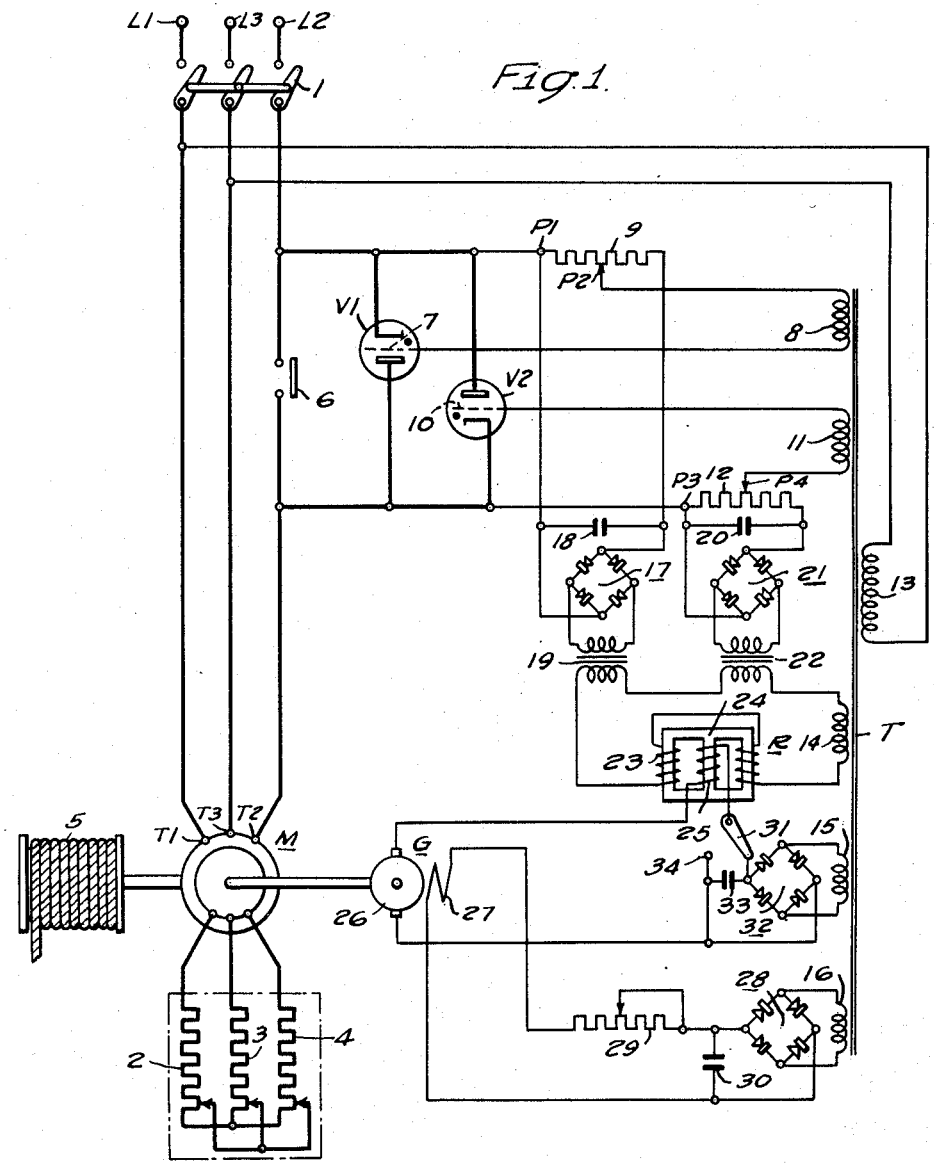
Figure 1 represents diagrammatically a control system according to the invention for a three-phase motor of the wound rotor type.

According to Fig. 1, the primary terminals T1, T2 and T3 of the three-phase wound rotor induction motor M are energized from lines or buses L1, L2 and L3 through a main switch 1. The secondary circuit of motor M includes the adjustable resistors 2, 3 and 4 whose effective resistance can be changed in any one of the several well known ways.

The motor M is shown to be mechanically connected to a hoist drum 5 and its performance will be described hereinafter with reference to the hoisting and lowering operations of a crane or hoist, although it should be understood that the invention is not limited to this particular application.

A switch 6 is interposed between the line terminal L2 and the motor terminal T2. When switches 1 and 6 are closed, for instance, during hoisting operations, the motor M is energized by a balanced three-phase voltage and hence with changes in load develops a given speed-torque characteristic. A speed-torque control is then controlled by changing the resistance in the secondary motor circuit.

Connected across the switch 6 are two electronic discharge tubes V1 and V2. These tubes are arranged in parallel and back-to-back relation to each other. The tubes V1 and V2 are plate energized by the voltage drop between line terminal L2 and motor terminal T2 so that their main function is substantially that of a controllable impedance device. It will be recognized that when both tubes are non-conductive with switch 6 open, almost no current will flow from line terminal L2 to motor terminal T2 so that the motor M is energized in single phase connection. Consequently, the motor characteristic will then correspond to the customary single-phase characteristic of zero torque at zero speed. When both tubes V1 and V2 are alternately fully conductive and hence have minimum impedance, the motor M is energized under approximately balanced three-phase conditions and hence will have high torque at zero speed. If the effective impedance of the tubes V1 and V2 is between the just mentioned limit conditions, for instance, when the tubes are conductive only during a limited interval of each voltage cycle, the motor receives a three-phase energization whose phase distribution is asymmetrical, or unbalanced, because the motor field winding across terminals T1 and T3 receives full excitation while the excitation of the other two motor windings is limited due to the impedance effect of the two tubes.

The tubes V1 and V2 consist preferably of discharge devices of the gaseous type, such as are known under the names Thyratron and also ignitron. The tubes illustrated in the drawings are assumed to be Thyratrons.

The control circuit of tube V1 attached to the tube grid 7 includes a secondary winding 8 of a transformer T in series with a tapped portion of a rheostat 9. Similarly, the grid 10 of tube V2 is connected to a control circuit which includes a secondary winding 11 of the transformer T in series with a tapped portion of a rheostat 12. The primary winding 13 of transformer T is connected across lines L1 and L3 under control by the above mentioned main switch 1.

The rheostat 9, in parallel with a smoothing capacitor 18, is connected across the output terminals of a rectifier 17. This rectifier is energized from the secondary of a transformer 19. The rheostat 12 is connected in parallel to a smoothing capacitor 20 across the output terminals of a rectifier 21 which is energized from the secondary of a transformer 22. The primary windings of transformers 19 and 22 are connected to the above mentioned secondary winding 14 of transformer T in series with the alternating current coils 23 of a saturable reactor 24. This reactor may be of the three-legged type, as illustrated, and is equipped with a direct current control winding 25 which permits imposing on the reactor core a controllable magnetization. The degree of this magnetization determines the effective reactance of the alternating current coils 23. The reactor core, during the normal control performance of the system remains magnetized below saturation so that the reactance of coils 23 is substantially proportional to the direct current voltage applied to the control winding 25. Consequently, the alternating current in the primary windings of transformers 19 and 22 is also dependent on the excitation of control coil 25 with the result that the rectified voltage imposed across the rheostats 9 and 12, respectively, are likewise dependent upon the excitation of coil 25. The resultant functioning of the reactor and its associated circuits is that of an amplifier. That is, small changes in current in the control coil 25 cause proportionate large changes in the voltages imposed across the rheostats 9 and 12.

The circuit for exciting the reactor control coil 25 is attached to a tachometer generator G whose armature 26 is mechanically connected to the shaft of motor M so that the generated voltage, at any given excitation of the appertaining generator field winding 27, is substantially proportional to the speed of the motor M. The field winding 27 is connected to the transformer secondary 16 through a rectifier 28 and a rheostat 29, a smoothing capacitor 30 being preferably provided. A change in the adjustment of the rheostat 29 has the effect of changing the value of the control voltage generated by generator G at any given speed of motor M and in consequence effects a corresponding change in the performance characteristic of the motor.

The circuit of coil 25 includes a selector switch 31 which, in the illustrated position, connects a rectifier 32 in series with the armature 26 of the tachometer generator. The rectifier 32 is energized from the secondary winding 15 of the transformer T and has preferably a capacitor 33 connected across its output terminals. If the contact 31 is switched into engagement with a contact 34, the output circuit of rectifier 32 is opened so that then the pilot generator G is the only source of excitation for the reactor coil 25.

The main switch 1, switch 6, switch 31 and the selector contacts appertaining to the resistors 2, 3, 4 and to the rheostat 29 are the control elements that are to be actuated for setting and changing the control performance of the system. The actuation of these elements is preferably controlled by a master controller (not shown) so that the operator is not burdened with any attention as to the maintenance of a proper operating sequence.

Reverting to the grid circuits of the impedance tubes V1 and V2, it will be recognized that each of these circuits contains two sources of component grid voltages. For instance, the grid voltage of the tube V1 is the resultant of an alternating component originating in the secondary 8 of transformer T and of a unidirectional component which corresponds to the voltage drop across points P1 and P2 of rheostat 9. The alternating component has a fixed amplitude and a proper phase relation to the voltage across the plate circuit of tube V1. The component voltage across the tapped portion of rheostat 9 is variable and depends upon the excitation of the reactor control coil 25. It is well known and requires no further explanation that in a grid circuit of this type the ignition moments of the tube relative to the cycle period of the plate voltage are shifted in dependence upon the change in the unidirectional component of the grid voltage. The same performance is inherent in the grid circuit of the tube V2 except that this tube, when conductive, operates in the off half cycles of the other tube.

When the contact 31 is in the illustrated position the rectified voltage between the terminals of the rectifier 32 is in opposition to the voltage generated in armature 26. Consequently, the resultant excitation of reactor coil 25 is then in accordance with the differential value of the two direct-current voltages impressed on the coil circuit. When the contact 31 engages the contact 34, only the voltage from the generator G is effective across the coil circuit.

When main switch 1 and switch 6 are closed while the motor M is at rest and hence the voltage of generator G zero, and with contact 31 in the illustrated position, the control coil 25 is energized from rectifier 32 and magnetizes the reactor core 24 near saturation so that the reactance of the alternating current coil 23 is relatively low. Consequently, the transformers 19 and 22 receive a relatively strong primary excitation and cause the rectifiers 17 and 21 to impose a correspondingly high direct current voltage across the respective rheostats 9 and 12. Under these conditions a relatively large negative grid bias is imposed on the grids 7 and 10, and both tubes V1 and V2 are prevented from firing. When the motor speed is not zero, with the just mentioned setting of the system, the voltage of generator G opposes that of rectifier 32 and hence decreases the excitation of coil 25. The corresponding decrease in magnetization of core 24 has the effect of increasing the reactance of coils 23. Then the transformers 19 and 22 receive a reduced primary excitation and cause a reduction in the unidirectional voltage components effective across the tapped portions of rheostats 9 and 12, respectively. As a result, the negative bias on the tube grids is reduced, and the tubes fire within each second half-wave period during an interval which increases with increasing speed of motor M.

It is assumed that the circuit connections existing in Fig. 1 when switch 1 and switch 6 are closed will energize the motor M to run in the hoist or forward direction. Consequently, one way of operating the system for hoisting is to maintain the switch 6 closed during all steps of hoisting performance and to then control the motor merely by changing the resistance in the secondary motor circuit. The motor will then develop a three-phase hoisting torque under balanced three-phase excitation. The motor characteristics thus obtainable are similar in type to the speed torque characteristic denoted by H3 in Fig. 2.

However, the system permits also a hoisting operation with speed torque characteristics typified by the curves H1 and H2 in Fig. 2. Characteristics of this type occur if the contact 31, during hoisting performance, is in engagement with contact 34 while the contact 6 is kept open. The two tubes V1 and V2 of motor M are then series connected in one phase of the primary motor circuit and their firing angle is controlled in dependence upon the motor speed. At zero speed the impedance of the reactor coil 23 is high because the control coil 25 is not excited. Consequently, the negative bias on the tube grids is at a minimum so that the tubes will fire at full angle. As a result the motor M receives a substantially balanced three-phase energization and develops starting torque in the hoisting direction. With increasing motor speed the correspondingly increasing tachometer voltage from generator G increases the magnetization of reactor R and hence reduces the reactance of coil 23. In consequence, the negative grid bias on tubes V1 and V2 is reduced so that these tubes reduce their firing angle and eventually will cease conducting at a given speed determined by the selected setting of the rheostat 29. This setting is under control by the operator in the manner described above. For instance, in one setting of rheostat 29 the speed torque curve of the motor M may correspond to the hoist characteristic H1 in Fig. 2. For the purpose of comparison, Fig. 2 shows also a broken-line curve H which represents the motor characteristic that would be obtained with the same resistance in the secondary motor circuit for which curve H1 is drawn but under a balanced three-phase energization across the primary terminals of the motor. The portion of curve H1 between points C and S is similar to the single-phase characteristic of the motor at the selected resistance in the secondary motor circuit. That is, during the curve portion between S and C, the tubes V1 and V2 are virtually non-conductive. The curve portion extending between points C and A denotes the range of increasing tube conductance. The torque at point A is approximately the same as that obtained with balanced three-phase excitation.

The curve H2 is characteristic of a control condition which differs from the one of characteristic H1 in a reduced resistance in the secondary motor circuit. A change in the adjustment of rheostat 29 has the effect of raising or lowering the approximate point C of transition between single-phase and three-phase operation.

Hoist characteristics of the type represented by curves H2 and H3 are advantageous, for instance, when applying the control system to drawbridges which require a high starting torque when lifting or opening the bridge and should develop a rapid decrease in torque once the load has been set in motion and especially shortly before it reaches the uppermost hoisting position.

One way of performing lowering operations with hoist controls according to the invention as illustrated in Fig. 1 is to leave the switch 6 open and to leave all resistors 2, 3 and 4 in the secondary motor circuit during all lowering steps. The control of the lowering performance is then merely effected by a change in the setting of the rheostat 29, with contact 31 in the position shown in the drawings.

Under these conditions the coil 25 is strongly energized from rectifier 32 as long as the motor M is at rest. Hence, the reactance of coils 23 is low and a high negative grid bias is applied to tubes V1 and V2. Both tubes are then non-conductive. Consequently, the motor receives single-phase excitation and has no starting torque due to that excitation. When a hoisting load sets the motor in downward motion, the generator G produces an increasing voltage which bucks that of rectifier 32 and hence causes the tubes V1 and V2 to start firing with a firing angle that increases with increasing motor speed. Consequently, the motor receives now a three-phase energization which produces a torque in the hoisting direction. This counter torque brakes the downward motion of the load. The counter torque increases with increasing lowering speeds and its magnitude can be varied by changing the adjustment of rheostat 29. A group of speed-torque characteristics typical for this performance is shown in Fig. 2 and denoted by D1, D2 and D3, respectively. These curves are characterized by zero torque at zero speed and by a transition towards balanced three-phase characteristics at increasing lowering speeds.

By virtue of the fact that the impedance devices V1 and V2 are electronic, the control system of the type just described has a very small time constant. Although the reactor and transformer elements employed in this system involve delay magnitudes, these elements are not as heavily loaded and are of smaller size, and are special in electric and magnetic respects than they would have to be if they were subjected to the load current and load voltage to be controlled. However, a further increase in the speed of control response can be obtained by employing electronic amplifying means instead of the amplifying devices described in the foregoing. This will be understood from the embodiment illustrated in Fig. 3 and described presently.

According to Fig. 3 the primary terminals T1, T2, T3 of a wound rotor motor M are connected to respective line terminals L1, L2, L3 through a reversing switch or contactor 41 which permits running the motor in either direction depending upon the selected position of the switch. The secondary circuit of the motor contains resistors 42, 43 and 44 whose effective resistance value can be changed as explained previously in connection with the embodiment of Fig. 1. A switch 46 is disposed between terminals L2 and T2 and, when open, is bridged by two discharge tubes V1 and V2 connected with each other in back-to-back relation also as in the embodiment of Fig. 1.

The grid circuits of the tubes V1 and V2 in the embodiment of Fig. 3 extend through a selector switch 47. The grid circuit of tube V1 includes a transformer winding 48 which provides an alternating component of grid voltage and a rheostat 49 for providing a variable unidirectional component of grid voltage. In series with winding 48 and rheostat 49 lies another rheostat 50 which acts as a source of a constant and unidirectional grid bias when the switch 47 is in the illustrated position. The grid circuit of tube V2 contains a secondary transformer winding 51, a rheostat 52 and a rheostat 53 for providing an alternating component grid voltage of constant amplitude, a variable unidirectional grid voltage and a constant grid bias, respectively. The windings 48 and 51 are part of a transformer TR whose primary winding 54 is connected across the line terminals L1 and L3. The secondary winding 55 energizes a rectifier 58 which imposes a constant voltage across the rheostat 50 in the grid circuit of tube V1. Similarly the transformer winding 56 feeds a rectifier 59 for imposing a constant voltage across the rheostat 53 in the grid circuit of tube V2.

The rheostat 49 is connected across a rectifier 60 whose input terminals are attached to the secondary winding 61 of a transformer TR1. The primary winding 62 of this transformer is energized from the output terminals of an electronic amplifier 63. Transformer TR1 has another secondary winding 64 which feeds a rectifier 65 for imposing a unidirectional voltage across the rheostat 52 in the grid circuit of tube V2. The power for amplifier 63 is supplied by the secondary winding 57 of transformer TR. The amplifier input terminals are connected to the secondary windings of three transformers denoted by 66, 67 and 68, respectively. The primary windings of these transformers have one of their respective terminals connected with one another while the remaining three terminals are attached to the three leads of the secondary motor circuit in series with respective capacitors 69, 70 and 71. The transformers 66, 67 and 68 are rated for normal operation at a high degree of magnetic saturation so that the amplitude of their respective output voltages will not appreciably exceed a given value regardless of changes in input voltage. These transformers act also to produce a peaked wave form of the output voltages. The purpose of the capacitors 69, 70 and 71 is to increase the input voltage with rising frequency. As a result, the resultant voltage imposed on the input terminals of the amplifier 63 responds substantially to the frequency of the voltage induced in the secondary circuit of motor M rather than to a change in magnitude of the secondary motor voltage. Since the frequency of the voltage induced in the secondary circuit of a wound rotor motor is dependent upon the slip frequency and hence an accurate measure of the motor speed, the resultant voltage applied to the amplifier 63 changes also in accordance with the motor speed. Consequently, the voltages impressed across the rheostats 49 and 52 in the grid circuits of tubes V1 and V2, respectively, vary also in accordance with the motor speed. The rectifiers 58 and 59 are connected to the appertaining rheostats 50 and 53 with such a polarity that the constant voltages impressed across the rheostats oppose the variable unidirectional voltage components effective across the respective rheostats 49 and 52 and impose a cut-off bias on the tubes V1 and V2 when the motor is at rest and hence the voltage across the rheostats 49 and 52 at a minimum. When the motor is in operation and increases its speed, the unidirectional speed-measuring voltages across rheostats 49 and 52 increase accordingly and hence cause the tubes V1 and V2 to fire during increasing intervals of each cycle period. Under these conditions, the performance of the system shown in Fig. 3 is similar to the above described lowering performance of the embodiment according to Fig. 1. When in the system of Fig. 3 the switch 47 is placed in its other position, the rheostats 50 and 53 are eliminated from the grid circuits of V1 and V2 so that then the control of these tubes is effected only by the speed-dependent voltage control devices. Then the tubes V1 and V2 will fire during maximum intervals of conductance as long as the motor is at rest and will decrease their firing angle with increasing motor speed. Consequently, the system will then operate substantially in the manner described above with reference to the hoisting performance of the system shown in Fig. 1 and represented by the speed torque characteristics H1 or H2 in Fig. 2.

In embodiments of the kind represented by Figs. 1 and 3, the automatic control due to the performance of the discharge tubes permits a variation of the speed torque characteristics between the limit characteristics of balanced three-phase energization and single phase (zero torque at zero speed) energization of the motor but does not afford counter torque operation of the motor unless additional control devices, such as the reversing contacts in Fig. 3 are provided. However, systems according to the invention can also be designed in such a manner that the control performance of the discharge tubes causes a torque reversal at a selected motor speed. An embodiment capable of such a counter torque performance will now be described with reference to Figs. 4, 5 and 6.

Figure 4:
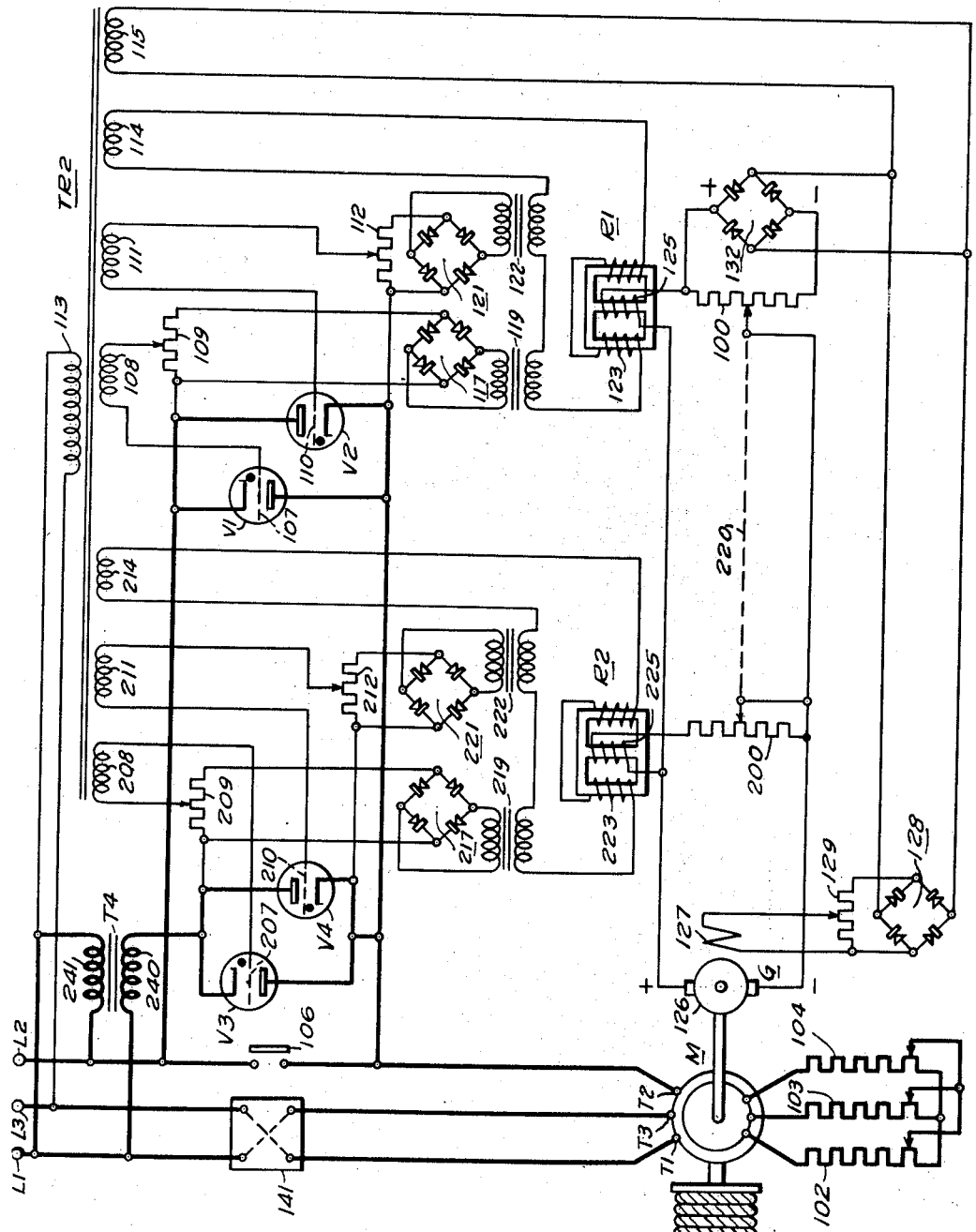
Fig. 4 shows the circuit diagram of a more elaborate embodiment which is capable of producing a torque reversal at any selected speed of the controlled motor.

According to Fig. 4, a wound rotor motor M has its primary terminals T1, T2, T3 connected to respective line terminals L1, L2, L3 and is provided with resistors 102, 103, 104 in the secondary circuit. The connection between terminals T2 and L2 is controlled by a switch 106 which is open when the electronic tubes mentioned hereinafter are in operation.

Connected across the contact 106 is a pair of discharge tubes V1 and V2 which are arranged in the same way as the tubes V1 and V2 in Fig. 1. The grid circuits and appertaining control devices of the tubes V1 and V2 in Fig. 3 are likewise similar to the corresponding circuit and devices of Fig. 1. In order to make this similarity readily apparent and to facilitate a comparison, the control elements appertaining to tubes V1 and V2 in Fig. 4 are denoted by the same reference numerals as the corresponding elements shown in Fig. 1 except that the prefix "10" or "1" has been added in Fig. 4. For instance, the grid 107, transformer winding 108, rheostat 109, shown in Fig. 4 correspond to the respective elements denoted by 7, 8 and 9 in Fig. 1, and the grid 110, transformer winding 111 and rheostat 112 in Fig. 4 correspond to the respective elements 10, 11 and 12 in Fig. 1. In further similarity to Fig. 1, the transformer windings 108 and 111 according to Fig. 4 appertain to a transformer TR2 whose primary winding 113 is connected across the line terminals L1 and L3. This transformer has additional secondary windings of which those denoted by 114 and 115 correspond to the windings 15 and 16 of transformer T in Fig. 1. The rheostat 109 in the grid circuit of tube V1 (Fig. 4) is impressed by a variable unidirectional voltage from a rectifier 117 which is energized by a transformer 119, while the rheostat 112 in the grid circuit of tube V2 is impressed by variable unidirectional voltage from a rectifier 121 energized by a transformer 122. The primaries of transformers 119 and 122 are energized from the transformer winding 114 under control by the reactance winding 123 of a saturable reactor R1 whose direct current control winding 125 is energized from two mutually opposing voltage sources, one being represented by the armature 126 of a tachometer generator G and the other by a rectifier 132 energized from the secondary winding 116 of transformer TR2. The voltage component derived from the rectifier 132 is adjustable by means of a rheostat 100. The field winding 127 of the tachometer generator G is energized from a rectifier 128 which is also energized from transformer winding 115, a calibrating rheostat 129 being provided in this embodiment.

It will be recognized that the tubes V1 and V2 according to Fig. 4 are controlled in substantially the same manner as the tubes V1 and V2 in Fig. 1 during the above described lowering performance of the system shown in the latter figure. That is, when the motor M in the system of Fig. 4 is at rest and the voltage of the tachometer generator substantially zero, the bias imposed on the reactor R1 from rectifier 132 produces a relatively high magnetization in the core of reactor R1 so that the reactance of winding 123 is low with the result of passing a relatively high current through the primaries of the transformers 119 and 122. In consequence, the voltage components impressed on the tapped portions of the rheostats 109 and 112 are sufficiently high to impose a cut-off bias on the tubes V1 and V2. Hence these tubes are non-conductive at zero speed and start conducting under increasing firing angles when the motor runs at increasing speed.

The system according to Fig. 4 is equipped with another pair of tubes denoted by V3 and V4. These tubes are also arranged in back-to-back relation to each other in order to be capable of conductance in successive half waves of voltage. However, their connection with the primary leads of the motor is such that, when they conduct, the voltage impressed on this pair of tubes is phase shifted relative to that effective across the pair V1 and V2. To this end, one terminal of the tube pair V3, V4 is connected to the motor terminal T2 while the other terminal is attached to line terminal L1 in series with the secondary 240 of a transformer T4 whose primary is connected across the line terminals L1 and L2. The phase-shifting circuit relation of the two tube groups thus obtained is more clearly apparent from the straight line diagram of the primary motor circuit represented in Fig. 5.

In Fig. 5 the motor terminals and line terminals are denoted by the same characters as in Fig. 4, and the three motor windings, extending between terminals T1, T2 and T3 are indicated by W1, W2 and W3, respectively. The windings 240 and 241 of transformer T4 are shown separately in Fig. 5. Let us assume that then only the tube pair V1, V2 is conductive that then the phase rotation of the voltage impressed on the motor terminals is such as to produce torque in the hoisting or forward direction. Then, the phase sequence of the voltages across windings W1, W2 and W3 is reversed, if the tubes V1 and V2 remain non-conductive while the tubes V2 and V4 are permitted to carry current. Such a reversing control is effected automatically by the grid control devices now to be described.

Reverting to Fig. 4, it will be seen that the tubes V3 and V4 have respective grid circuits of a design similar to those of tubes V1 and V2. The circuit attached to grid 207 of tube V3 includes in series a transformer secondary 208 and a rheostat 209. The circuit attached to grid 210 of tube V4 includes in series a transformer secondary 211 and a rheostat 212. The rheostat 209 is impressed by a variable unidirectional voltage from a rectifier 217 energized through a transformer 219. Similarly, the rheostat 212 is energized from a rectifier 221 attached to a transformer 222. The transformers 219 and 222 are connected to the secondary 214 of transformer TR3 in series with the reactance winding 223 of a saturable reactor R2. The control winding 225 of this reactor is connected across the armature 126 of the generator G in series with an adjusting rheostat 200.

The performance of the tubes V2 and V4 is similar to that of the tubes V1 and V2, except that the excitation of control winding 225 in reactor R2 is controlled only by the variable voltage of the generator G and not under the influence of the voltage drop imposed on rheostat 100 by the rectifier 132. Consequently when the motor and generator are at rest, no voltage is effective across the control winding 225 so that the reactance of winding 223 is at a maximum. This results in a low energization of transformers 219 and 222 so that the bias effective on the grids 207 and 210 causes the tubes V2 and V4 to conduct with a maximum firing angle. When the motor speed has a finite and, for instance, increasing value, the reactor R2 becomes increasingly magnetized and reduces its reactance so that the firing angle of tubes V2 and V4 is decreased until, beyond a given motor speed, both tubes remain non-conductive.

The two pairs of tubes operate in such a manner that only one pair is conductive at a time, and that when the speed condition changes, a point will be reached where these tubes stop firing while the other pair of tubes starts operating. During such shift in performance, the firing angle of the first operating tube pair is gradually decreased to zero and thereafter the firing angle of the other pair of tubes is gradually increased to a maximum. The speed value at which the shift from one to the other pair occurs depends on the setting of the controlling voltage sources. Assuming that the generator field winding 127 receives constant excitation, this speed value can be adjusted by changing the adjustment of the rheostats 100 and 200. These two rheostats are preferably ganged together or otherwise interconnected, as is indicated by the broken line 220. The adjustment may occur in steps, for instance, by the actuation of a master controller (not illustrated) which also controls the contact 106 and the resistors 102, 103, 104 in the secondary motor circuit. If desired, the system may contain a reversing contactor as indicated at 141 so that the tube-controlled torque reversing performance can be obtained during hoisting or forward operation as well as during lowering or reverse operation. The reversing contactor 141 may also be under control by the above-mentioned master controller.

A typical performance of the system is exemplified by the speed torque diagram of Fig. 6 which relates to the use of the system for controlling the lowering operation of a hoist or crane motor. Three different characteristics are denoted in Fig. 6 by D4, D5 and D6. Referring, for instance, to the characteristic D5, one of the two pairs of tubes will fire as long as the motor performance corresponds to the curve branch between points B and E. At point B, the firing angle of this pair of tubes is at a maximum. As the performance approaches the point E, the firing angle decreases, and at the point E, the pair of tubes ceases firing while the other pair commences to conduct current with a low firing angle which increases as the motor performance approaches, on curve D5, the point F. During the performance along branch BE, the torque of the motor is in the lowering direction. At the speed denoted by point E the torque reverses due to the reversal in the phase rotation of the motor voltage so that an increasing hoisting or counter torque is imposed on the motor as the performance approaches zero speed (point F). The speed value represented by point E can be chosen by changing the setting of the control system, for instance, by adjusting the two rheostats 100 and 200. In this manner the operator can determine as to whether the motor characteristic is to follow the curve D4, D5 or D6. In a similar way, a system of this type can produce a torque reversal at a selected speed during hoisting or forward operation to the motor, for instance, when applied for the control of draw bridges.

It will be apparent from the various embodiments described in this specification that my invention is capable of alteration and modification in different respects, and it will be understood by those skilled in the art that the essential features of the invention, as set forth in the appended claims, can be realized in embodiments different from those specifically illustrated and described herein.

I claim as my invention:

1. A motor control system, comprising a three-phase alternating-current motor, a three-phase circuit connected to said motor for impressing voltage thereon and comprising two controllable electronic discharge tubes connected with at least two phases of said circuit so as to determine the phase sequence of said voltage depending upon the relative conductance conditions of said respective tubes, each of said tubes having a control circuit for controlling said conductance condition, voltage control means connected to said motor for providing a variable control voltage substantially in accordance with the motor speed, operator-adjustable control means for providing a constant control voltage of selective magnitude, and circuit means connecting said speed-dependent control means and said operator-adjustable control means with said two grid circuits so that a variation in the resultant effect of said two control voltages changes said respective conductance conditions in inverse relation to each other, whereby said motor is caused to reverse its torque at a speed determined by the selected setting of said operator-adjustable control means.

2. A motor control system, comprising a three-phase alternating-current motor, a three-phase circuit connected to said motor for impressing voltage thereon and comprising two pairs of controllable electronic discharge tubes, the tubes of each pair being parallel-connected in back-to-back relation to each other and said two pairs being connected with at least two phases of said circuit so as to determine the phase sequence of said voltage depending upon the relative conductance conditions of said respective pairs, each of said tubes having a control circuit for controlling said conductance condition, voltage control means connected to said motor for providing a variable control voltage substantially in accordance with the motor speed, operator-adjustable control means for providing a constant control voltage of selective magnitude, and circuit means connecting said speed-dependent control means and said operator-adjustable control means with said grid circuits so that a variation in the resultant effect of said two control voltages changes the respective conductance conditions of said two pairs of tubes in inverse relation to each other, whereby said motor is caused to reverse its torque at a speed determined by the selected setting of said operator-adjustable control means.

3. A motor control system, comprising a three-phase alternating-current motor, a three-phase circuit connected to said motor for impressing voltage thereon and comprising two pairs of controllable electronic discharge tubes, the tubes of each pair being parallel-connected in back-to-back relation to each other and said two pairs being connected with at least two phases of said circuit so as to determine the phase rotation of said voltages depending upon which of the tube pairs is conductive at a time, each of said tubes having a control circuit for varying the conductive intervals of the tube relative to the cycle period of said voltage, voltage control means connected to said motor for providing a variable control voltage indicative of the motor speed, operator-adjustable control means for providing a constant control voltage of selective magnitude, and circuit means connecting said speed-dependent control means and said operator-adjustable control means with said grid circuits of said two tube pairs in inverse relation of one pair to the other so that a progressive variation in control voltage decreases said conductive intervals of one tube pair to zero at a motor speed determined by the selected setting of said operator-actuable control means and before said other tube pair becomes conductive in increasing intervals of conductance.

4. A motor control system, comprising a multiphase wound-rotor motor having primary terminals and a secondary resistance circuit, multiphase circuit means connected to said terminals to supply alternating current thereto, a controllable discharge tube having a plate circuit series-connected in one phase of said circuit means and having a control circuit for varying the conductive intervals of said tube, a source of variable control voltage having high-saturation transformers primarily connected to said secondary motor circuit and secondarily connected to said control circuit so as to provide said variable control voltage substantially in dependence upon the frequency of the voltage induced in the rotor of said motor, a source of a constant control voltage, said two voltage sources being connected to each other and being both connected to said control circuit for controlling the latter in accordance with the resultant effect of the two control voltages, and operator-actuable control means associated with one of said sources for selectively adjusting the variable control voltage and constant control voltage relative to each other so as to obtain a given control condition of said control circuit at a motor speed determined by the selected setting of said control means.

WILLIAM R. WICKERHAM.

REFERENCES CITED

The following references are of record in the file of this patent:

UNITED STATES PATENTS

| Number | Name | Date |
| --- | --- | --- |
| 1,376,453 | Meyer | May 3, 1921 |
| 2,325,454 | Wilcox | July 27, 1943 |
| 2,386,581 | Wickerham | Oct. 9, 1945 |